US007211350B2

(12) United States Patent
Amatucci

(10) Patent No.: US 7,211,350 B2
(45) Date of Patent: May 1, 2007

(54) NANOSTRUCTURE LITHIUM TITANATE ELECTRODE FOR HIGH CYCLE RATE RECHARGEABLE ELECTROCHEMICAL CELL

(75) Inventor: Glenn G. Amatucci, Raritan, NJ (US)

(73) Assignee: Rutgers University Foundation, New Brunswick, NJ (US)

( * ) Notice: Subject to any disclaimer, the term of this patent is extended or adjusted under 35 U.S.C. 154(b) by 0 days.

(21) Appl. No.: 09/771,809

(22) Filed: Jan. 29, 2001

(65) Prior Publication Data

US 2002/0102205 A1   Aug. 1, 2002

(51) Int. Cl.
  *H01M 4/58* (2006.01)
  *H01M 6/00* (2006.01)
  *C01D 1/00* (2006.01)
  *C01D 15/02* (2006.01)
  *C01D 17/00* (2006.01)

(52) U.S. Cl. .............. 429/231.95; 429/231.5; 423/641; 29/623.1

(58) Field of Classification Search .......... 429/231.1, 429/231.95, 231.5
  See application file for complete search history.

(56) References Cited

U.S. PATENT DOCUMENTS

| 5,478,674 A | | 12/1995 | Miyasaka |
| 5,569,561 A | * | 10/1996 | Exnar et al. ............. 429/218 |
| 5,763,120 A | | 6/1998 | Saidi et al. |
| 5,872,074 A | * | 2/1999 | Schulz et al. ............. 502/328 |
| 5,919,588 A | * | 7/1999 | Jose et al. ............. 429/224 |
| 6,120,938 A | * | 9/2000 | Atsumi et al. ............. 429/231.1 |
| 6,165,641 A | * | 12/2000 | Striebel et al. ............. 429/212 |
| 6,475,673 B1 | * | 11/2002 | Yamawaki et al. ............. 429/231.5 |

OTHER PUBLICATIONS

T. Ohzuku et al., "Zero-Strain Insertion Material of Li[Li 1/3 TI 5/3]04 for Rechargeable Lithium Cells", J. Electrochem. Soc., 1995, vol. 142, No. 5, pp. 1431-1435.
Peramunage et al., "Preparation of Micron-Sized Li 4 TI 5 O 12 and Its Elecrochemistry in Polyacrylonitrile Electrolyte-Based Lithium Cells", J. Electrochem.Soc., 1998, vol. 145, No. 8, pp. 2609-2615.

* cited by examiner

*Primary Examiner*—Patrick Joseph Ryan
*Assistant Examiner*—Julian Mercado
(74) *Attorney, Agent, or Firm*—Lowenstein Sandler PC

(57) ABSTRACT

Rechargeable electrochemical cells, such as lithium batteries and asymmetric hybrid battery/supercapacitor systems, exhibiting exceptional specific capacity levels and stability over extended high-rate recharge cycling comprise nanostructure zero strain $Li_4Ti_5O_{12}$ intercalation electrode material synthesized in a short duration process of annealing mixed $TiO_2$ and Li-source precursor compounds at about 800° C. for a time of about 15–30 min which is not substantially longer than that required to effect maximum available reaction between the precursors, thereby substantially eliminating the growth of synthesized $Li_4Ti_5O_{12}$ particles beyond nanostructure size. The process reduces by order of magnitude the time and energy required for synthesis of the active electrode material and fabrication of utilizing cell devices, and provides such nanostructure material which enables repeated, high-rate recharge cycling without loss of cell capacity or efficiency.

4 Claims, 7 Drawing Sheets (a) 120 min (b) 60 min (c) 15 min

NANOSTRUCTURE LITHIUM TITANATE ELECTRODE FOR HIGH CYCLE RATE RECHARGEABLE ELECTROCHEMICAL CELL

BACKGROUND OF THE INVENTION

The present invention relates to rechargeable electrochemical energy storage systems, particularly to such systems comprising materials capable of reversibly taking up and releasing lithium ions as a means of storing and supplying electrical energy. More specifically, the invention relates to the synthesis and utilization of nanostructure lithium titanate as the active electrode component material of electrochemical cells capable of exhibiting high specific capacity at high recharge rates.

During the course of development of rechargeable lithium ion cells and the like, numerous materials capable of reversibly accommodating lithium ions have been investigated. Among these, occlusion and intercalation materials, such a carbonaceous and graphitic compounds, and transitions metal oxide spinels, have proved to be particularly well-suited to such applications. However, even while performing significantly well in high capacity recycling electrical storage systems, many of these materials exhibit detrimental properties which detract from the ultimate operation of rechargeable cell devices.

Notable among such shortcomings of active cell materials is the tendency toward physical expansion to a greater or lesser degree upon taking up the mobile ions, e.g., $Li^+$ ions, which form the critical basis for the function of such systems. While the relatively minute size of $Li^+$ ions, as compared to other mobile ion species of varying efficacy, minimizes to a great extent the physical strain upon the electrode material structure, there nonetheless often results from repetitive cycling effects a significant loss of electrochemical cell capacity, whether due to internal disruption of electrical continuity within the structure of the active compound or otherwise.

Extensive investigation into this so-called "electromechanical grinding" effect has revealed certain compounds which exhibit little or no physical expansion or flexing during the recharge cycling lithiation/delithiation process. Particularly notable in this respect is the lithium titanate defect spinel, $Li_4Ti_5O_{12}$, reported by T. Ohzuku et al., *J. Electrochem. Soc.*, 142, 1431 (1995), as a "zero-strain" insertion material. The reported test results of the efficacy of this material as an active counter-electrode component in a rechargeable lithium intercalation battery cell showed a remarkable capacity stability over extended cycling which indeed evidenced a low level of physical expansion nominally attributable to zero-strain ion insertion.

However, these promising capacity retention results were achieved at cycling rates of about C/3, i.e., at such low energy density as to require about 3 h to effect a complete charge or discharge operation, thereby allowing sufficient time to all but ensure thorough $Li^+$ ion transfer to or from the active electrode material and provide an encouraging indication of a correspondingly high level of cell specific capacity. Such long charging periods are, unfortunately, impractical and unacceptable in the marketplace. Subsequent testing of similar $Li_4Ti_5O_{12}$ material prepared in the manner of Ohzuku, that is, by 10–12 h, 750–800° C. annealing of a mixture of $TiO_2$ and a thermolabile Li precursor, such as $LiOH.H_2O$, at more acceptable cycling rates in excess of about 2C, i.e., at a charging energy density level sufficiently high to yield a full charge in ½ h, revealed that the otherwise promising zero-strain material could not maintain for any reasonable length of time a recharge capacity of more than about 50% of that initially exhibited at low cycling rates.

Attempts to improve recharge capacity of $Li_4Ti_5O_{12}$ electrodes at higher cycling rates by reducing the particle size of this incorporated intercalation material were reported by Peramunage et al., *J. Electrochem. Soc.*, 145, 2609 (1998). Such an approach would have appeared to have significant merit, since it could generally be observed that, while the rate at which an ion species, such as $Li^+$, is capable of diffusing into a given host intercalation compound is a function of the molecular structure of such compound, the radial distance the ion must travel to complete intercalation throughout a host particle, i.e., the size of such particle, will determine the overall intercalation capability, or specific capacity, of a mass of the host compound. In such investigations, the authors utilized submicron-sized $TiO_2$ and $LiOH$ or $Li_2CO_3$ precursors in the process of Ohzuku (10 h anneal at 800° C.) to reportedly obtain submicron particles of $Li_4Ti_5O_{12}$ material and thus substantially reduce the time required to provide thorough intercalation into the material. While some improvement in the recharge capacity of Li battery cells was shown by levels of 100–120 mAh/g at 1C to 1.2C cycle rates, significant capacities achieved at rates above 1.5C remained of borderline practicality.

Further investigations into the problem of high cycle rate recharge capacity of $Li_4Ti_5O_{12}$ electrode materials have been undertaken here and have revealed that synthesized $Li_4Ti_5O_{12}$ particles continue to enlarge during prolonged annealing, thus leading to detraction from any initial improvement in capacity at high cycling rates which the use of nanostructure precursor material particles might otherwise have provided. Resolution of this problem during the course of the present invention has resulted from the discovery of a process which yields consistent nanostructure $Li_4Ti_5O_{12}$ product and provides such materials and electrochemical cells which exhibit remarkable improvement in high cycle rate capacity to the extent of many-fold increases in effective cycle rates. In addition, the invention provides a process for synthesizing such materials which realizes magnitude increases in economies of time and energy.

SUMMARY OF THE INVENTION

The present invention provides, in one aspect, a process for synthesizing lithium titanate, typically $Li_4Ti_5O_{12}$, of nanostructure dimensions, i.e., having an average primary particle size of less than 100 nm, useful as a zero-strain active electrode material for rechargeable electrochemical cells capable of providing high specific energy storage capacity while operating at high recharge rates. Although this synthesized material is often referred to in this description by the basic formula, $Li_4Ti_5O_{12}$, it should be noted that similar compounds comprising minor amounts of functional substituents, such as alkaline earth and transition metal ions, are likewise intended.

The synthesis process of the invention comprises intimately mixing stoichiometric amounts of precursors comprising nano-sized $TiO_2$ and at least one thermolabile compound, such as $LiOH$, $Li_2CO_3$, $C_2H_3LiO_2$, or the like, which provides a source of lithium; rapidly heating the mixture, e.g., in a period of less than about 2 min, to a temperature of about 750–800° C.; holding the mixture at such temperature for a period of time, about 10–45 min, not significantly greater than that sufficient to substantially complete the reaction of the precursors to form $Li_4Ti_5O_{12}$; and rapidly cooling the resulting $Li_4Ti_5O_{12}$, e.g., in a similar period of less than about 2 min, thereby preventing heat-induced growth of synthesized $Li_4Ti_5O_{12}$ particles and preserving the nanostructure of such compound.

The time of synthesis reaction normally depends primarily on the rate at which the mass of precursor mixture particles can be heated to the reaction temperature and the consistency of their being so maintained until reaction completion, a point which may be readily noted in the consumption of $TiO_2$ precursor as seen in characteristic x-ray diffraction (XRD) data. In order to minimize the time of exposure of the synthesized $Li_4Ti_5O_{12}$ product to elevated reaction temperature and thereby prevent heat-induced primary particle growth beyond the nanostructure range, the particles of precursor mixture are preferably brought into the closest practical contact with the heating medium, generally heated ambient atmosphere. To achieve this end, the mass of precursor composition particles may be reduced to a layer of minimum thickness, as in a batch kiln vessel or a continuous process moving belt furnace, or may be agitated during reaction, as in a fluidized bed or tumbler furnace, or in an injected flame reactor or spray roaster system.

The invention further comprises the incorporation of the resulting nanostructure $Li_4Ti_5O_{12}$ as a dispersed active material with commonly employed binder, plasticizer, and adjunct components to form an electrode member which is combined with complementary electrode and separator members to fabricate a rechargeable electrochemical cell. Such a cell may be cycled at rates in the range of C to 10C, yet retains the capability of providing recharge capacity in excess of 130 mAh/g with less than about 2% capacity loss over the span of hundreds of recharge cycles.

BRIEF DESCRIPTION OF THE DRAWING

The present invention will be described with reference to the accompanying drawing of which.

DESCRIPTION OF THE INVENTION

Figure 1:
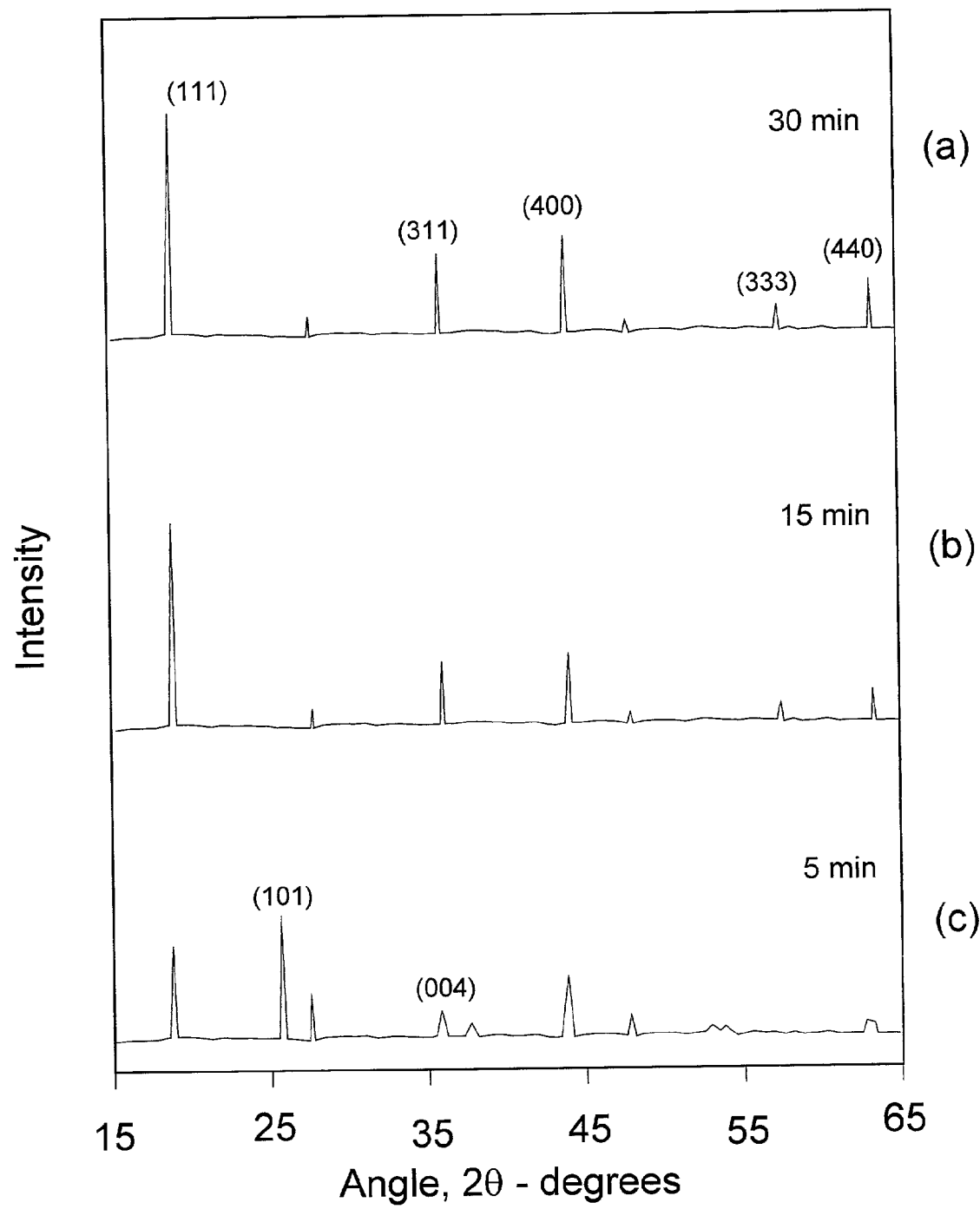
FIG. 1 depicts characteristic x-ray diffraction (XRD) trace data at comparative stages in the synthesis process of the present invention.

The synthesis process aspect of the present invention by which nanostructure zero-strain $Li_4Ti_5O_{12}$ electrode material of stable capacity at high recharge cycle rate may be prepared initially follows a procedure of the prior art as described in the above-cited works of Ohzuku et al and Permunage et al. The latter work, in particular, is relevant in that Permunage et al. investigated the possible merit in utilizing $Li_4Ti_5O_{12}$ electrode material of micron particle size range and applied in their synthesis of such material the logical expedient of employing precursor compounds in the range of sub-micron particulates. Thus, Permunage et al. combined micro-particles of $TiO_2$ and $Li_2CO_3$ to form a precursor composition which, in accordance with the ohzuku et al. procedure, they then annealed at about 800° C. for a period in the range of about 10 h before recovering the $Li_4Ti_5O_{12}$ reaction product.

Unfortunately, the anticipated yield of microparticle $Li_4Ti_5O_{12}$ was not forthcoming; rather, the annealed product consisted of significantly larger primary particles and sintered agglomerate masses which the authors were thereafter required to pulverize in order to obtain their nominal "sub-micron" active electrode component. It is with respect to this annealing step and subsequent processing that the present invention represents a distinct and unique departure from the prior art and, as a result, achieves the current remarkable results in synthesis economies and electrochemical device performance.

During the development of the present invention, precursor compositions of mixed nanostructure $TiO_2$ and $Li_2CO_3$, prepared by either dry mechanical or liquid vehicle suspension mixing, were initially subjected to the extended annealing utilized by earlier investigators. These processing periods in actual practice required up to about 16 h, considering the included times of ramping to and from the desired range of 800° C. reaction temperature. With a view toward reducing the undesired primary particle and agglomerate growth experienced in these and earlier investigations, as well as toward reducing the overall expenditure of energy and time, the annealing period was shortened to a length which was, at a maximum, just sufficient to complete the synthesis reaction. Further, in the course of determining a desirable processing period, the previously utilized temperature ramping was eliminated and the precursor mixture was subjected directly to the reaction temperature range of about 750–800° C., such as by inserting the mixture into a pre-heated reaction environment.

EXAMPLE I

The determination of minimum annealing time for sufficient reaction of mixed precursor compounds was effected in the following manner. 40.0 g of commercial nanostructure $TiO_2$ (30–50 nm) was dry-milled with 14.8 g of $Li_2CO_3$ to obtain an homogeneous master batch of precursor mixture. Sample portions of about 2 g of the master mix were successively utilized by distributing the powder as a layer of about 10 mm thickness in the bottom of an alumina crucible and inserting the crucible into an oven preheated to about 750–800° C. Each subsequent sample was allowed to remain in the oven for a decreasing predetermined time before being removed and allowed to immediately cool to room temperature, thereby essentially quenching the sample and preventing further reaction. The resulting $Li_4Ti_5O_{12}$ reaction product was then examined by standard $CuK_\alpha$ x-ray diffraction (XRD) to ascertain whether the applied annealing time were sufficient to ensure complete reaction of the mixed precursors.

Surprisingly, particularly in view of the comparative extraordinarily long annealing times utilized in prior art processes, at completion of the test series the minimum required reaction time for thorough synthesis of $Li_4Ti_5O_{12}$ under the described conditions was determined to be in the range of a mere 15–30 min. This threshold range was indicated by the appearance of the characteristic 25.50° XRD peak in 5 min annealed sample which signified the presence of unreacted $TiO_2$ precursor. This transition is apparent in the sequential XRD traces of reaction products resulting from 30, 15, and 5 min annealing times as represented in FIG. 1(a)–1(c).

Figure 2:
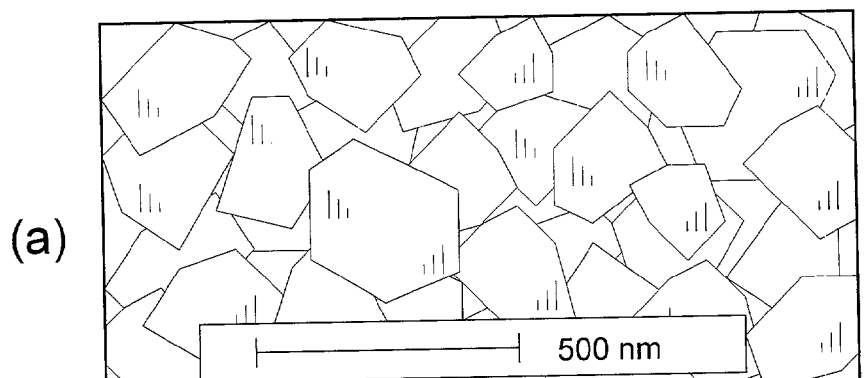
FIG. 2 depicts comparative scanning electron microscope (SEM) views of $Li_4Ti_5O_{12}$ particles at varying stages in the synthesis process of the invention.
Figure 2:
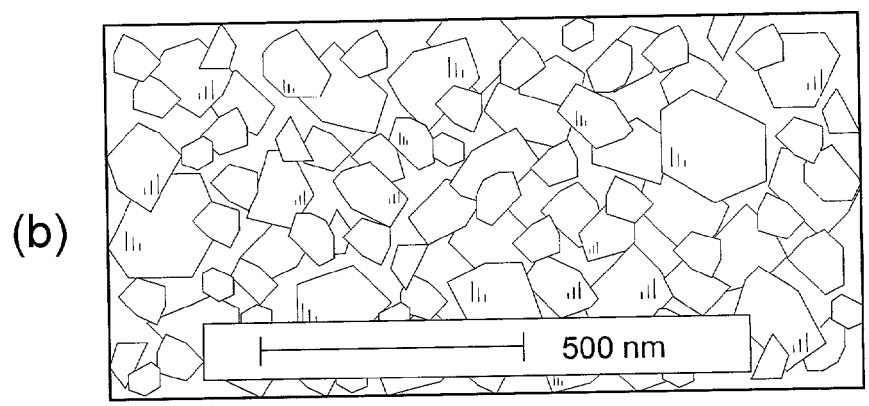
Figure 2:
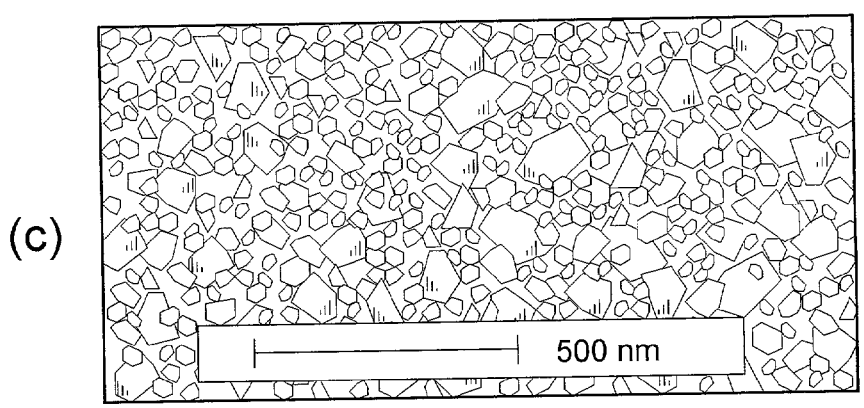

In addition to the noted XRD examination of the progressively obtained $Li_4Ti_5O_{12}$ reaction products, each sample was viewed by scanning electron microscopy (SEM) to determine the product morphology. Such views of the products obtained in the latter stages of the test series, i.e., at shorter annealing times approaching the minimum required for complete synthesis of the $Li_4Ti_5O_{12}$ particles, are represented in FIG. 2(a)–2(c) showing the relative sizes of primary particles resulting from annealing for 120, 60, and 15 min, respectively. From these SEM views it was apparent that even from nanostructure precursors the primary particle size of the synthesized $Li_4Ti_5O_{12}$ continues to increase from the nanostructure particles averaging about 40 nm at the FIG. 2(c) threshold 15 min annealing stage to average sizes of about 120 nm at 60 min (FIG. 2(b)), 205 nm at 120 min (FIG. 2(a)), and 480 nm at 16 h (not shown). These progressive increases in $Li_4Ti_5O_{12}$ particle size would indicate that such dimension morphology is dictated principally by annealing time, rather than by precursor particle size, as was envisioned by Permunage et al.

In order to determine the relative effect that the varying $Li_4Ti_5O_{12}$ particle size has on the electrochemical behavior of cells comprising such material as an active electrode component, a series of such cell electrodes was prepared and tested as follows in widely employed polymeric rechargeable lithium battery cells, in a manner such as described in U.S. Pat. No. 5,460,904.

EXAMPLE II

Figure 3:
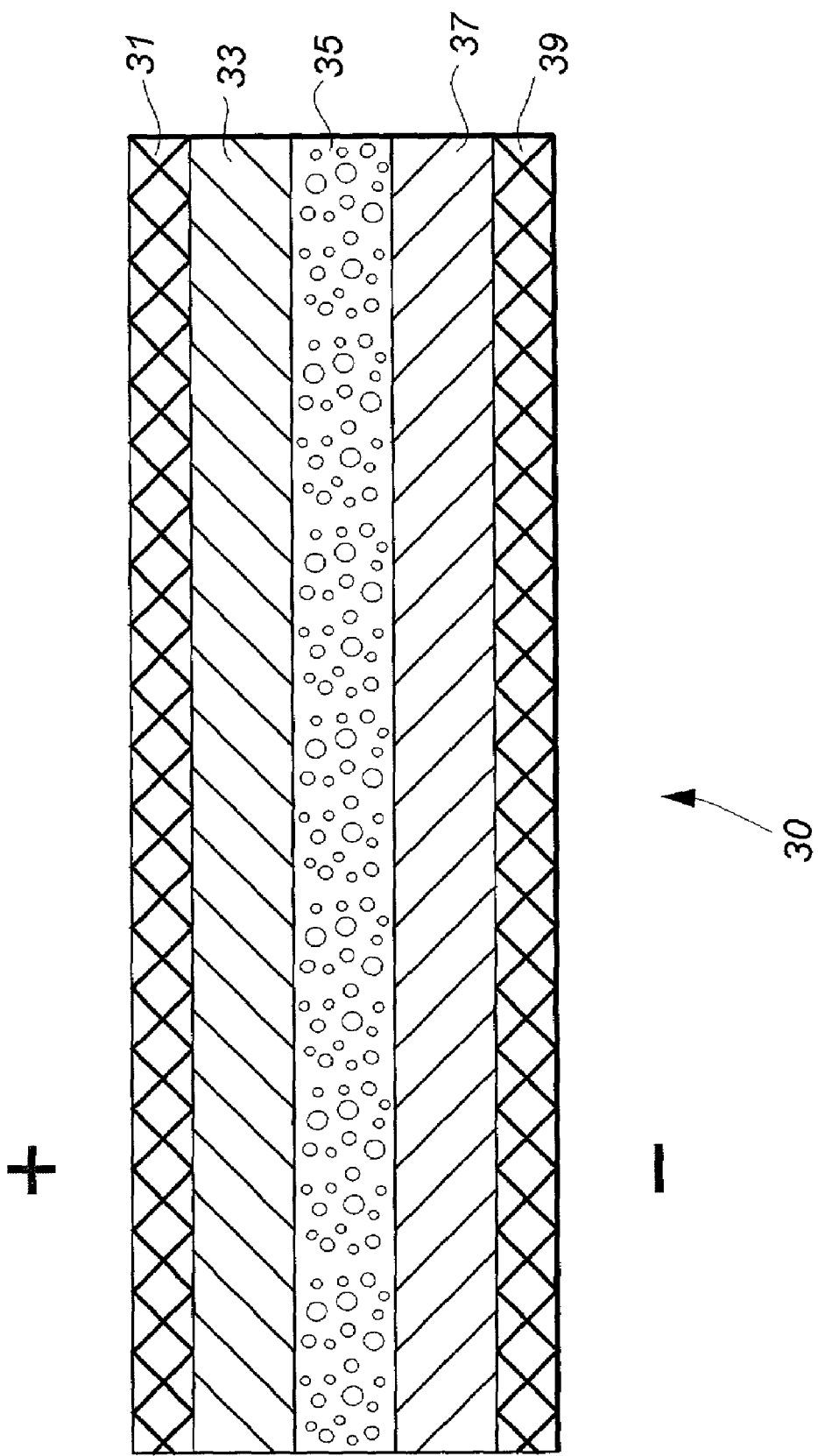
FIG. 3 depicts, in cross-sectional elevation, a typical electrochemical cell fabricated with nanostructure $Li_4Ti_5O_{12}$ according to the present invention.

As seen in FIG. 3, a battery test cell structure 30 comprises a positive electrode member 33, a negative electrode member 37, and an interposed separator member 35 containing cell electrolyte. Current collector members 31, 39 associated with the respective positive and negative electrode members provide points of electrical circuit contact for the cell.

Typically, positive electrode 33 comprises a vinylidene copolymer matrix membrane in which is dispersed the $Li_4Ti_5O_{12}$ test material, while negative counter-electrode 37 comprises a similar copolymer matrix dispersion of an active material compound, or simply an active metal foil, capable of reversibly plating, alloying, intercalating, or otherwise providing a source of lithium ions. Separator 35 may likewise be a polymeric membrane, as described in the referenced specification, or it may comprise a widely used microporous membrane or simply a glass fiber mat, any of which is capable of retaining the non-aqueous electrolyte, e.g., about a 0.5 to 2 M solution of a monovalent lithium cation compound in a solvent mixture of cyclic and acyclic carbonates.

The lithium intercalation test cell of the present example comprised a positive electrode 33 cast as a layer of a dispersion composition comprising 28 parts by weight of the respective $Li_4Ti_5O_{12}$ sample, 6 parts of conductive carbon black (MMM super P), 15 parts of poly(vinylidene fluoride-co-hexafluoropropylene) (Elf Atochem, Kynar 2801) binder, and 23 parts of dibutyl phthalate plasticizer in 28 parts of acetone. The layer was dried at room temperature for about 0.5 h to form a self-supporting membrane, and disks of 1 $cm^2$ were cut from the membrane to provide electrode members comprising about 5 to 20 mg of the $Li_4Ti_5O_{12}$ active material. In order to prepare the cell for introduction of electrolyte in the manner of prior art laminated cell structures, the plasticizer was extracted from the electrode disk member with diethyl ether prior to assembly with the remaining cell components.

As a laboratory test expedient, negative electrode member 37 was cut as a 1 $cm^2$ disk from a section of lithium foil and the electrode members were assembled under substantially anhydrous conditions (−80° C. dewpoint) in a Swagelok test cell with an intervening disk separator member 35 of borosilicate glass fiber mat saturated with a 1 M electrolyte solution of $LiPF_6$ in a 2:1 mixture of ethylene carbonate (EC) and dimethyl carbonate (DMC). Stainless steel pressure plate components of the Swagelok cell served as current collectors 31, 39.

Figure 4:
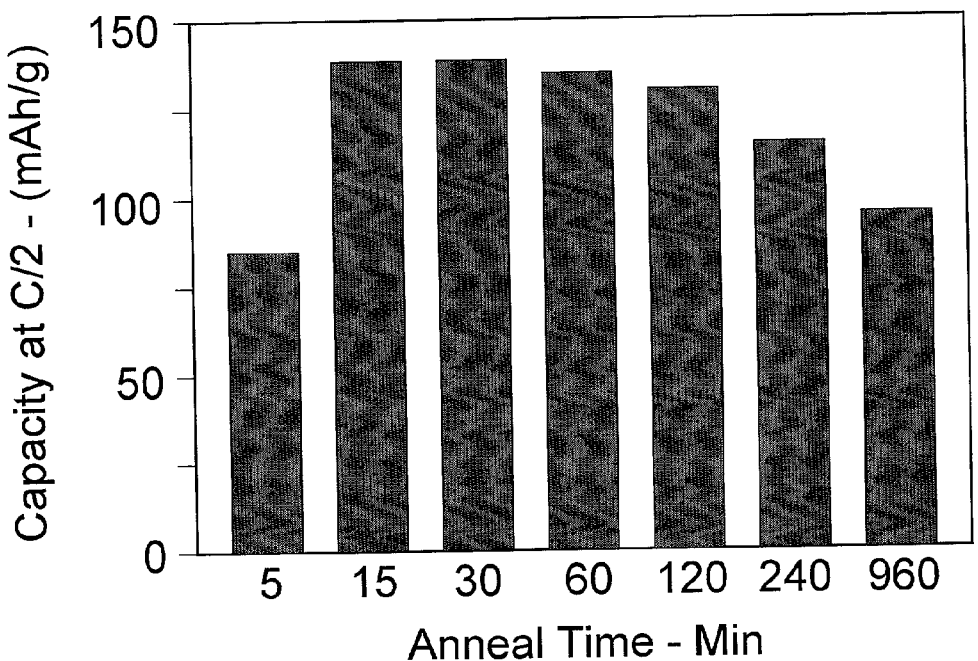
FIG. 4 depicts comparative initial low cycle rate capacities exhibited by cells comprising $Li_4Ti_5O_{12}$ subjected to varying annealing times during synthesis.

Each test cell was then cycled in circuit with a commercial automatic cycling-control/data-recording system operating in the galvanostatic mode at a constant charge of about 70 mA/g of $Li_4Ti_5O_{12}$ active material, thereby achieving a cycling rate of about C/2 which is sufficiently low to ensure substantially thorough intercalation of $Li^+$ ions into the $Li_4Ti_5O_{12}$ active electrode component irrespective of the particle size of such material. The recorded data indicating the maximum specific discharge capacity of each test cell comprising a $Li_4Ti_5O_{12}$ electrode material of different anneal time from 5 to 960 min were plotted to yield the relative such capacity levels depicted in FIG. 4. As is apparent, the maximum specific capacities are exhibited by those materials having the minimum anneal times, in the range of 15–30 min, which ensure complete precursor reaction and which were observed to yield the minimum primary particle size, as well.

EXAMPLE III

Figure 5:
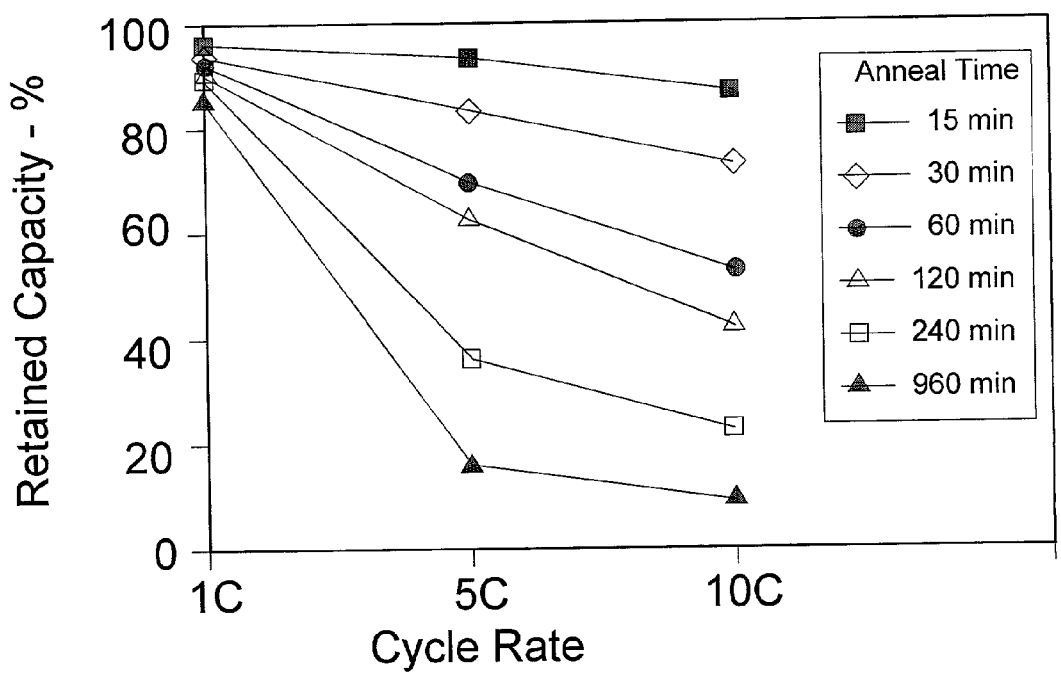
FIG. 5 depicts comparative capacity level retention by the cells of FIG. 4 at varying cycle rates.

Similar series of test cells were cycled at varying increased rates of 1C, 5C, and 10C to determine the effect of $Li_4Ti_5O_{12}$ particle size on the ability of a cell to exhibit stable high capacity levels while cycling at such higher rates. The resulting data were plotted as indication of the degree of initial capacity, as determined in Example II, which each active material sample of increasingly long anneal time, and thus larger particle size, was capable of maintaining as input current density increased, and thus intercalation time decreased. The plots of such data shown in FIG. 5 indicate the superior capacity retention of the preferred, smaller particle $Li_4Ti_5O_{12}$ materials obtained from annealing times in the range of 15–30 min. The unsatisfactory performance of materials prepared by annealing in excess of about 8 h in accordance with the above-noted practices of the prior art are particularly apparent.

EXAMPLE IV

Figure 6:
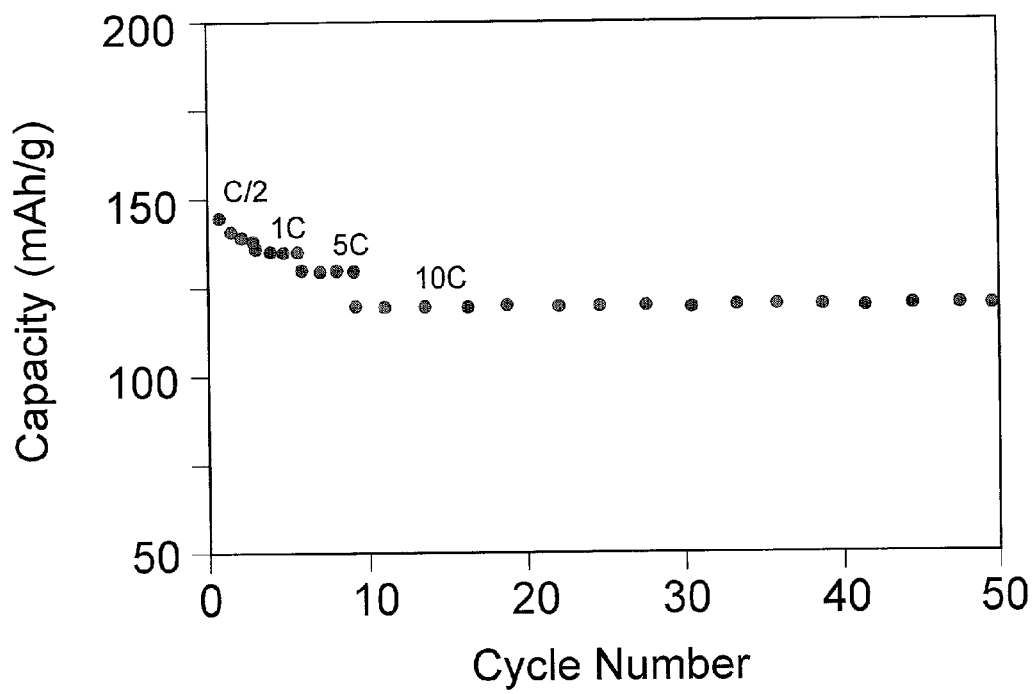
FIG. 6 depicts the effect of recharge cycle rate on the capacity level and stability of a cell comprising a preferred $Li_4Ti_5O_{12}$ embodiment of the present invention.

A test cell was prepared in the foregoing manner comprising a preferred 15 min anneal time nanostructure (40 nm) $Li_4Ti_5O_{12}$ positive electrode active material and was sequentially cycled at rates of C/2, 1C, 5C, and 10C, with the latter sequence extending beyond about 50 cycles. The exceptional initial level and subsequent stability of specific capacity of the cell are apparent in the plotted data shown in FIG. 6.

EXAMPLE V

Figure 7:
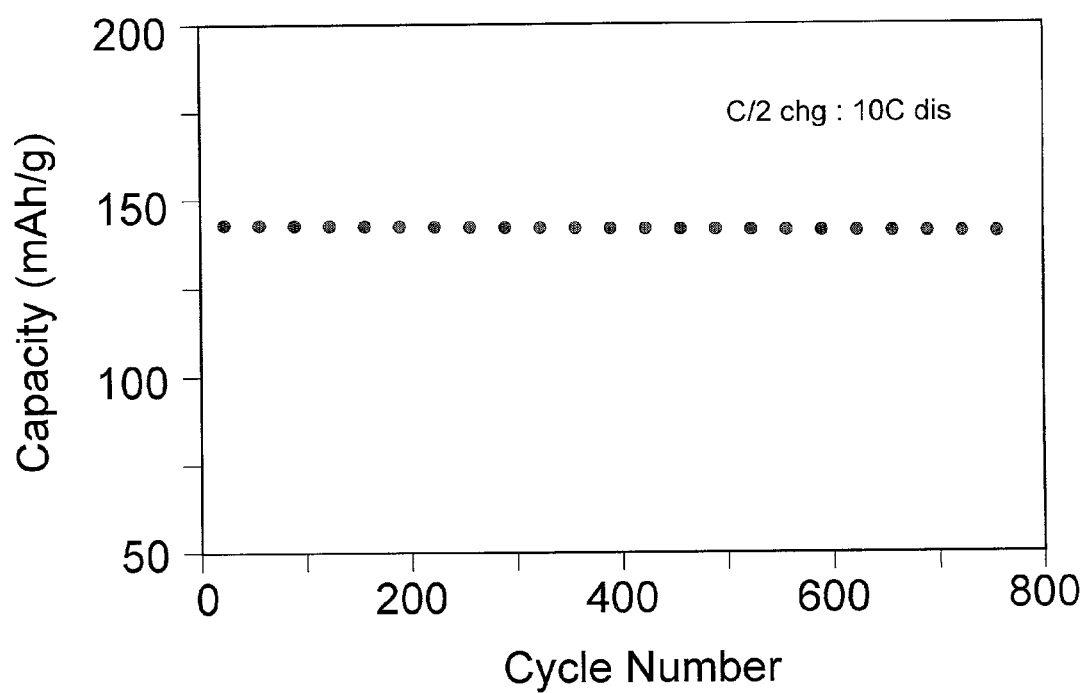
FIG. 7 depicts the capacity level and stability over extended cycling of a preferred cell embodiment of the invention.

A similar cell comprising the preferred 15 min $Li_4Ti_5O_{12}$ electrode material was subjected to extended cycling at consistent rates of C/2 charge, 10C discharge. A plot of the specific discharge capacity of about 142 mA/g over a test period in excess of 700 cycles is depicted in FIG. 7 and shows the remarkable stability of such capacity which decreased by less than about 2%.

EXAMPLE VI

A master mix of 20.0 g nanostructure $TiO_2$ and 4.8 g LiOH was annealed in the manner of Example I for a period of about 20 min. The resulting $Li_4Ti_5O_{12}$ was use to prepare a rechargeable battery test cell as described in Example II. In a like test procedure this cell exhibited cycling properties substantially similar those noted in Example IV.

EXAMPLE VII 20.0 g of nanostructure $TiO_2$ and 7.4 g $Li_2CO_3$ were slurried with rapid stirring in about 10 ml methanol. After removal of the dispersion vehicle, the homogeneous mixture of precursors was annealed in the manner of Example I for a period of about 20 min. The resulting $Li_4Ti_5O_{12}$ was used to fabricate the negative electrode member 37 of a rechargeable Li-ion battery cell embodiment of the electrochemical cell generally shown in FIG. 3. This polymeric electrode layer was cast from a composition comprising 65.3 parts by weight of the $Li_4Ti_5O_{12}$, 6.5 parts of conductive carbon black (MMM super P), 10.1 parts of poly(vinylidene fluoride-co-hexafluoropropylene) (Elf Atochem, Kynar 2801) binder, and 18.1 parts of dibutyl phthalate plasticizer in about 30 parts of acetone.

A positive counter-electrode 33 was cast from a similar composition comprising 65.3 parts of nanostructure $LiMn_2O_4$, the thickness of this electrode member being controlled during casting to provide an active component weight ratio in similarly sized electrode members approximating 1.2 $LiMn_2O_4$ to 1.0 $Li_4Ti_5O_{12}$. Test cell structure 30 was completed, after extraction of the plasticizer components, to include separator member 35 comprising a commercial microporous polyolefin membrane and current collector members 31, 39 respectively comprising aluminum and copper micromesh foils. The structure was ultimately sealed in a typical foil/polymer film enclosure with an electrolyte comprising a 1 M solution of $LiPF_6$ in an equipart mixture of ethylene carbonate (EC) and dimethyl carbonate (DMC).

Figure 8:
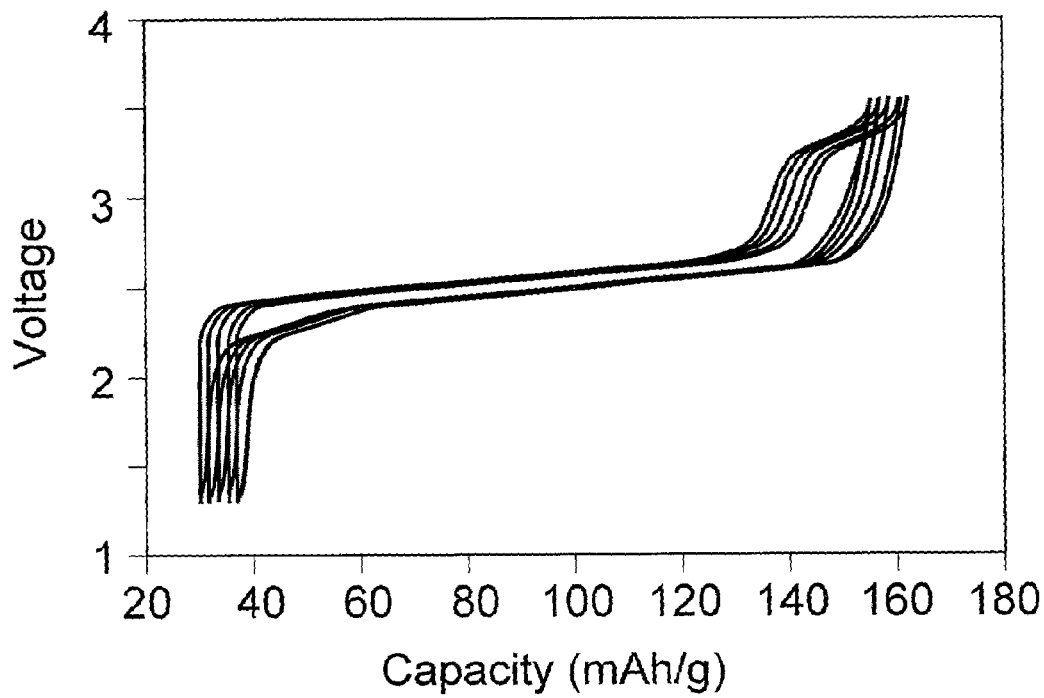
FIG. 8 depicts the characteristic voltage/capacity curve of a Li-ion rechargeable battery cell comprising nanostructure $Li_4Ti_5O_{12}$ according to the invention.
Figure 9:
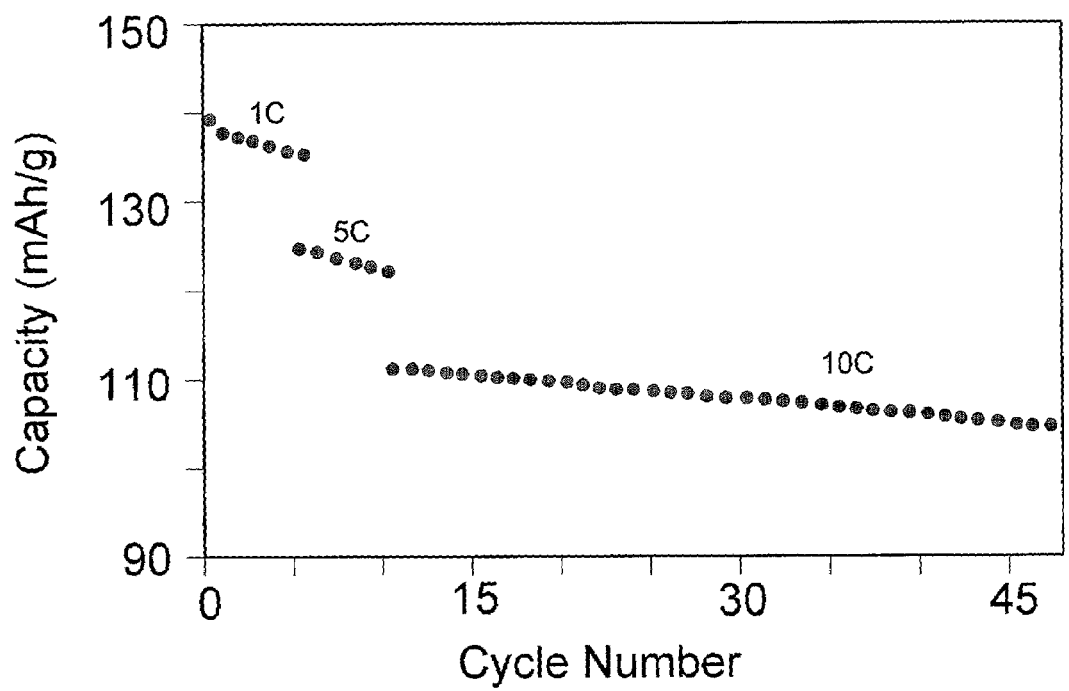
FIG. 9 depicts the effect of recharge cycle rate on the capacity level and stability of the cell of FIG. 8.

The resulting Li-ion rechargeable cell was subjected to cycling tests in the manner of the foregoing examples, and the data were plotted as the characteristic voltage/capacity curve of the cycling cell, as seen in FIG. 8, as well as the remarkable discharge capacity level and stability of the $Li_4Ti_5O_{12}$ electrode over extended cycles as a function of cycling rate, as shown in FIG. 9.

EXAMPLE VIII

Figure 10:
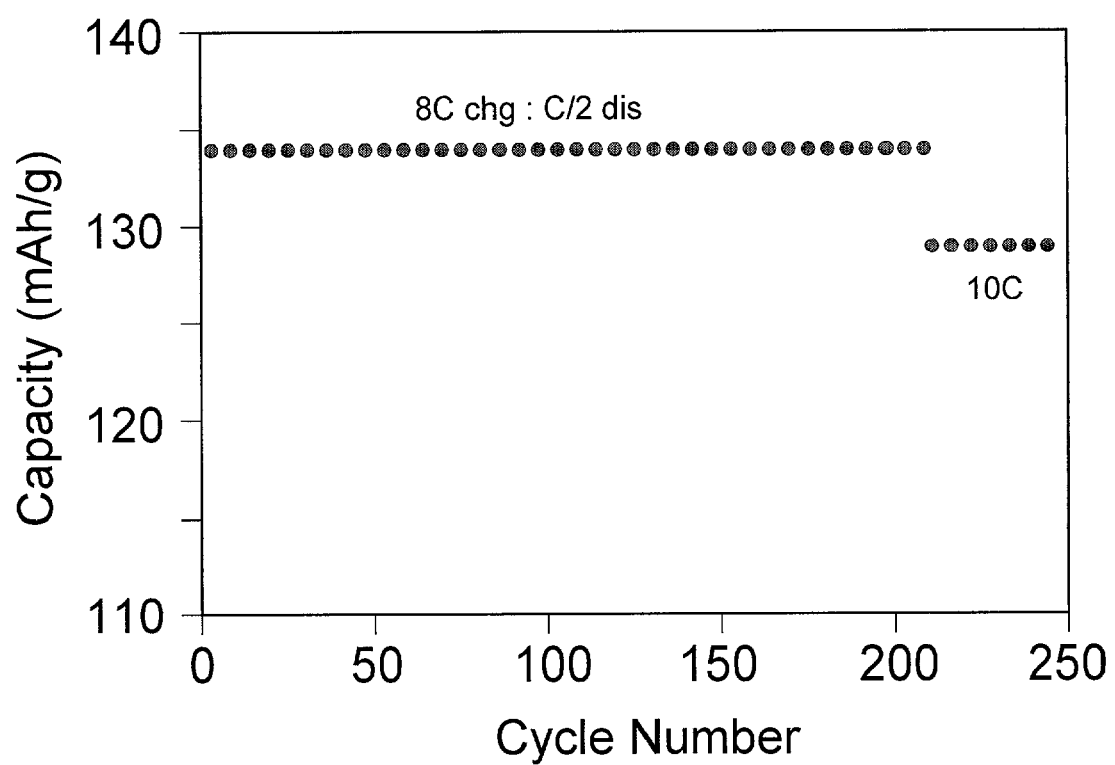
FIG. 10 depicts the effect of recharge cycle rate on the capacity level and stability of an asymmetric rechargeable hybrid battery/supercapacitor cell comprising nanostructure $Li_4Ti_5O_{12}$ according to the invention.

A polymeric $Li_4Ti_5O_{12}$ composition layer as prepared in Example VII was utilized as the negative battery cell electrode 37 of a rechargeable asymmetric battery/supercapacitor hybrid electrochemical cell embodiment of a device as generally depicted in FIG. 3. The positive polymeric layer supercapacitor counter-electrode 33 was cast of a similar composition comprising, instead of the $Li_4Ti_5O_{12}$ intercalation material component, 65.3 parts of a commercial high surface area (1500 $m^2$/g) activated carbon powder, with the thickness of the cast layer being controlled such as to provide in the final cell an activated carbon to $Li_4Ti_5O_{12}$ weight ratio of about 4.2 to 1.0. The results of cycling tests on this asymmetric cell provided the data depicted in FIG. 10 which shows the extraordinary level and stability of the high charge rate capacity achievable by this device.

It is anticipated that other embodiments and variations of the present invention will become readily apparent to the skilled artisan in the light of the foregoing description and examples, and it is intended that such embodiments and variations likewise be included within the scope of the invention as set out in the appended claims.

What is claimed is:

1. A nanostructured particulate lithium titanate intercalation compound comprising an average primary particle size of less than 100 nm.

2. A nanostructured particulate lithium titanate intercalation compound having an average primary particle sizes of less than 100 nm synthesized by a method comprising:

Providing a homogeneous mixture of co-reactant precursors comprising nanostructure $TiO_2$ and at least one thermolabile source of lithium ions;

Heating said mixture rapidly to a reactive annealing temperature of about 750–800 C;

Holding said mixture at said annealing temperature for a period of time not substantially longer than that required to effect the maximum available reaction of said mixed precursors in synthesizing said intercalation compound particles of less than 100 nm; and Cooling said synthesized particles rapidly to a temperature below the reaction temperature required for the synthesis of said intercalation compound thereby preventing further growth of said particles.

3. A rechargeable electrochemical cell comprising:

A negative electrode member comprising a first electrochemically active material;

A positive electrode member comprising a second electrochemically active material; and A separator member comprising an electrolyte interposed between said negative and positive electrode members;

Wherein at least one of said active materials comprises a nanostructured particulate lithium titanate intercalation compound having an average primary particle sizes of less than 100 nm.

4. An electrode comprising nanostructured lithium titanate particles comprising an average primary particle size of less than 100 nm.

* * * * *